United States Patent
Robert et al.

(10) Patent No.: US 9,715,947 B2
(45) Date of Patent: Jul. 25, 2017

(54) SYSTEMS FOR DEBRIS MITIGATION IN NUCLEAR REACTOR SAFETY SYSTEMS

(71) Applicant: GE-Hitachi Nuclear Energy Americas LLC, Wilmington, NC (US)

(72) Inventors: Curt J. Robert, Wilmington, NC (US); Jose L. Casillas, San Jose, CA (US); Feibiu D. Shum, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1152 days.

(21) Appl. No.: 13/963,352

(22) Filed: Aug. 9, 2013

(65) Prior Publication Data

US 2015/0043701 A1   Feb. 12, 2015

(51) Int. Cl.
*G21C 19/42*   (2006.01)
*G21C 15/18*   (2006.01)
(Continued)

(52) U.S. Cl.
CPC ........... *G21C 15/18* (2013.01); *G21C 19/307* (2013.01); *G21C 9/004* (2013.01); *Y02E 30/40* (2013.01)

(58) Field of Classification Search
CPC  G21C 15/18; G21C 15/182; G21C 2015/185; G21C 2015/187
See application file for complete search history.

(56) References Cited

U.S. PATENT DOCUMENTS 4,609,523 A * 9/1986 Gerlowski ............... G21C 9/00
                                                                  376/282
5,390,220 A * 2/1995 Zuloaga, Jr. ......... G21C 3/3206
                                                                  376/313
(Continued)

FOREIGN PATENT DOCUMENTS

EP          1653479 A1   5/2006
JP          07174880 A   7/1995
(Continued)

OTHER PUBLICATIONS

Nuclear Regulatory Commission, "Resolution of Generic Safety Issues: Issue 191: Assessment of Debris Accumulation on PWR Sump Performance (Rev. 2) ( NUREG-0933, Main Report with Supplements 1-34)," Mar. 29, 2012 (available at http://www.nrc.gov/reading-rm/doc-collections/nuregs/staffisr0933/sec3/191r2.html).

(Continued)

*Primary Examiner* — Marshall O'Connor
(74) *Attorney, Agent, or Firm* — Ryan Alley Intellectual Property Law

(57) ABSTRACT

Filtering systems and methods remove debris from coolant in a nuclear reactor setting. One or more filters are installed outside coolant reservoirs specifically where coolant will flow toward the reservoir, such as during a transient or other coolant leak event. Useable filters permit coolant through-flow while catching, straining, diverting, or otherwise removing debris from the coolant without significant interference with the coolant flow.

Filters can be installed at any location in a flow path for coolant flowing toward the reservoir, including pipes draining into a suppression pool, floor or personnel platform gratings, areas around main steam legs or steam generators, in a reactor drywell, etc. One or more filters are installed by securing the filter in a coolant flow path into a coolant source. Installation and maintenance can be performed during any maintenance period.

15 Claims, 3 Drawing Sheets

(51) Int. Cl.
*G21C 19/307* (2006.01)
*G21C 9/004* (2006.01)

(56) References Cited

U.S. PATENT DOCUMENTS

| | | | | |
|---|---|---|---|---|
| 5,390,221 | A | * 2/1995 | Dix | G21C 3/3206 |
| | | | | 376/310 |
| 5,473,650 | A | 12/1995 | Johansson | |
| 5,483,564 | A | 1/1996 | Matzner | |
| 5,488,634 | A | 1/1996 | Johansson | |
| 5,528,640 | A | 6/1996 | Johansson | |
| 5,539,793 | A | 7/1996 | Johansson | |
| 5,696,801 | A | 12/1997 | Dwyer | |
| 5,748,694 | A | 5/1998 | King | |
| 5,835,549 | A | 11/1998 | Sibiga | |
| 6,195,892 | B1 | * 3/2001 | Weems | G21C 15/18 |
| | | | | 29/402.11 |
| 8,317,035 | B2 | 11/2012 | Elkins | |
| 2006/0075697 | A1 | 4/2006 | Oates et al. | |
| 2006/0219645 | A1 | 10/2006 | Bilanin | |
| 2007/0084782 | A1 | 4/2007 | Smith | |
| 2010/0025315 | A1 | 2/2010 | Smith | |
| 2011/0215059 | A1 | 9/2011 | Smith | |
| 2012/0273408 | A1 | 11/2012 | Elkins | |

FOREIGN PATENT DOCUMENTS

| | | | | |
|---|---|---|---|---|
| JP | 07248392 | A | 9/1995 | |
| JP | 1039080 | * | 2/1998 | G21C 15/18 |
| JP | 1039080 | A | 2/1998 | |
| JP | 2002168985 | A | 6/2002 | |
| JP | 3096599 | | 9/2003 | |
| JP | 2006126193 | A | 5/2006 | |
| JP | 2006-265920 | | 10/2006 | |
| JP | 2008249341 | A | 10/2008 | |

OTHER PUBLICATIONS

Nuclear Regulatory Commission, "Potential Impact of Debris Blockage on Emergency Recirculation During Design Basis Accidents at Pressurized-Water Reactors" NRC Generic Letter Feb. 2004, Sep. 13, 2004 (available at http://pbadupws.nrc.gov/docs/ML0423/ML042360586.pdf).

Unofficial English Translation of Japanese Office Action issued in connection with corresponding JP Application No. 2014-159110 on Jun. 21, 2016.

Unofficial English Translation of JP Office Action in corresponding JP Application 2014-159110 of Mar. 7, 2017.

* cited by examiner

SYSTEMS FOR DEBRIS MITIGATION IN NUCLEAR REACTOR SAFETY SYSTEMS

BACKGROUND

FIG. 1 is a schematic of a conventional nuclear power station containment building 36 that houses a reactor pressure vessel 42 with various configurations of fuel 41 and reactor internals for producing nuclear power. Reactor 42 sits in a drywell 51, including upper drywell 54 and a lower drywell 3 that provides space surrounding and under reactor 42 for external components and personnel. Several different pools and flowpaths constitute an emergency core coolant system inside containment 36 to provide fluid coolant to reactor 26 in the case of a transient involving loss of cooling capacity in the plant.

For example, containment 36 may include a pressure suppression chamber 58 surrounding reactor 42 in an annular or other fashion and holding suppression pool 59. Suppression pool 59 may include an emergency steam vent used to divert steam into suppression pool 59 for condensation and heat sinking, to prevent over-heating and over-pressurization of containment 36. Suppression pool 59 may also include flow paths that allow fluid flowing into drywell 54 to drain, or be pumped, into suppression pool 59. Suppression pool 59 may further include other heat-exchangers or drains configured to remove heat or pressure from containment 36 following a loss of coolant accident. An emergency core cooling system line and pump 10 may inject coolant from suppression pool 59 into reactor 42 in order to make up lost feedwater and/or other emergency coolant supply.

Lines taking coolant from suppression pool 59, either for injection into reactor 42 via ECCS line 10 or for heat exchanging outside containment 36 or other uses, conventionally use an intake strainer in suppression pool 59 to filter debris found in suppression pool 59. For example, US Patent Publication 2011/0215059 to Carr et al. and 2006/0219645 to Bilanin et al., discuss strainers submerged and used in suppression pool 59 to prevent debris from entering ECCS pumps and reactor 42. The US NRC's "Resolution of Generic Safety Issues: Issue 191: Assessment of Debris Accumulation on PWR Sump Performance (Rev. 2) (NUREG-0933, Main Report with Supplements 1-34)" of Mar. 29, 2012 further discusses the effects of debris from suppression pool 59 on reactor and emergency system chemistry and operation. The disclosures of each of these publications are incorporated herein in their entireties.

As shown in FIG. 1, other emergency cooling systems are useable with reactor 42, including a gravity-driven cooling system pool 37 that can further provide coolant to reactor 42 via piping 57 and/or a passive containment cooling system pool 65. Any or all discussed safety system may be used alone or in any combination in various reactor designs, each to the effect of preventing overheating and damage of core 41, reactor 42 and all other structures within containment 36 by supplying necessary coolant, removing heat, and/or reducing pressure.

SUMMARY

Example embodiments include filtration systems and methods that remove debris from coolant in a nuclear power reactor. Example embodiments are useable in a wide variety of nuclear power reactor setups that include some sort of reactor vessel and an associated coolant source into which leaking or released coolant can flow, such as a suppression pool, for example. Example embodiments include one or more filters installed outside the source at specific locations where coolant will flow toward the source. Example embodiments may use filters that facilitate coolant flow and debris removal without absorbing or otherwise impeding coolant flow, such as fuel-assembly-type filters having fixed channels.

Some example locations for installation may include pipes or tubes draining into a suppression pool, floor or personnel platform gratings, areas around main steam legs or steam generators, and/or any other location in a flow path for escaping coolant. A filter in example embodiments can be installed in an "open-air" or voided location where the filter will contact coolant only in the instance of a leak, transient, or other operating condition that causes coolant to flow through areas that are otherwise not occupied by coolant, such as in a reactor drywell, for example.

Example methods include installing example filtering systems by affixing a filter at a location known to be a coolant flow path into a coolant source. Installation and maintenance of any installed filter can be performed during any maintenance period, such as during an operational outage for refueling, for example. Example methods may install one or more filters at locations that are not within coolant and thus may not require any special adaptation for a coolant environment; for example, if a coolant is water, no diving or submersible activity may be required for installation.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
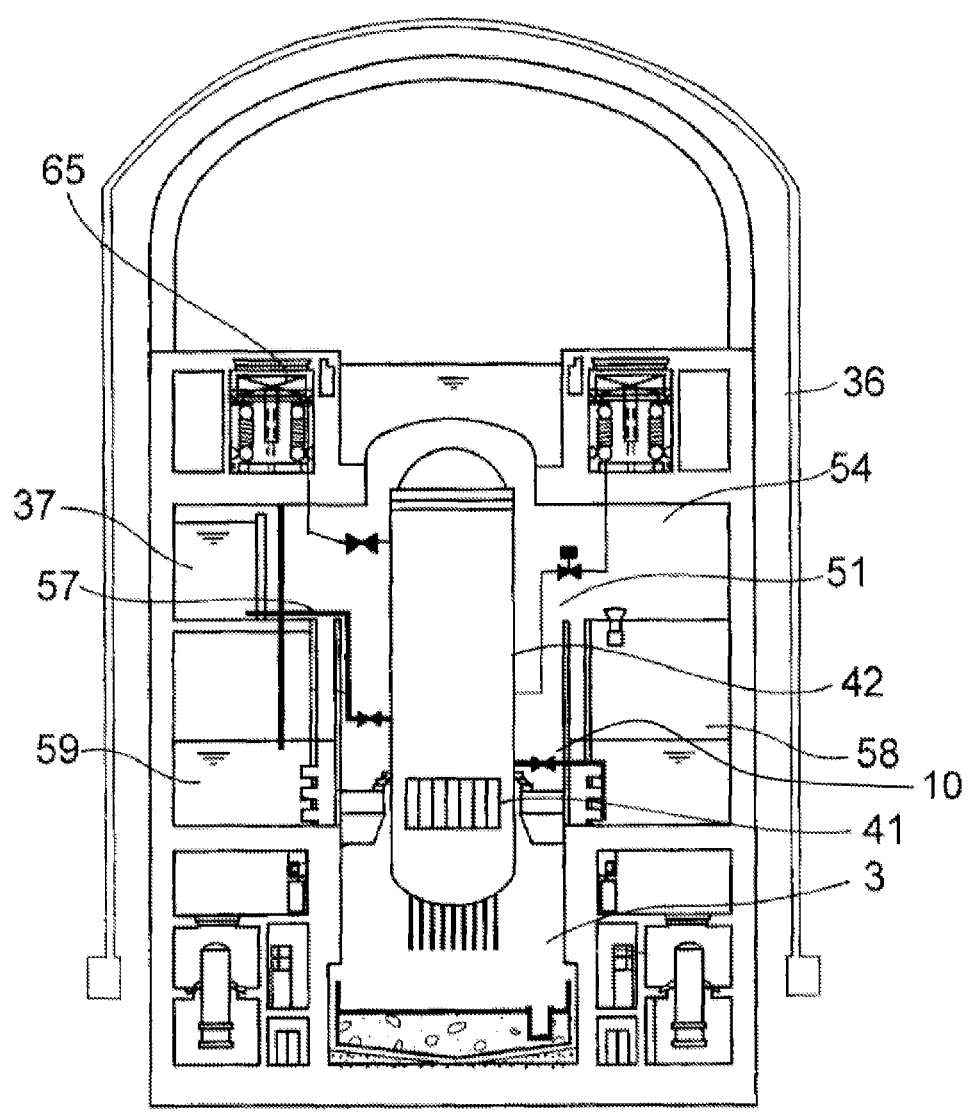
FIG. 1 is a schematic of a related art nuclear power containment and internals.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized problems in existing debris-mitigation systems for nuclear power stations. Particularly, Applicants have recognized that various strainers and filters placed in coolant sources may easily become clogged when their operation is most critical to plant safety and/or may not adequately prevent smaller debris from being injected into a reactor in the instance of an emergency. Such smaller debris may be readily created in transient situations due to failure of plant components and/or operation of rarely-used safety systems. When a strainer immersed in a suppression pool becomes clogged, emergency injection of coolant into a reactor may be compromised; similarly, when smaller debris is allowed into a reactor during emergency injection, additional system failure, and even increased fuel damage, may occur due to such debris.

The present invention is systems and methods for debris mitigation in a nuclear power reactor setting that use at least one filtering device installed at a position external to a coolant for the reactor. The present invention uses filters that are effective at removing debris from coolant but do not substantially impede coolant flow when coming into contact with coolant. Example embodiments discussed below illustrate just a few different options useable with this invention.

Figure 2:
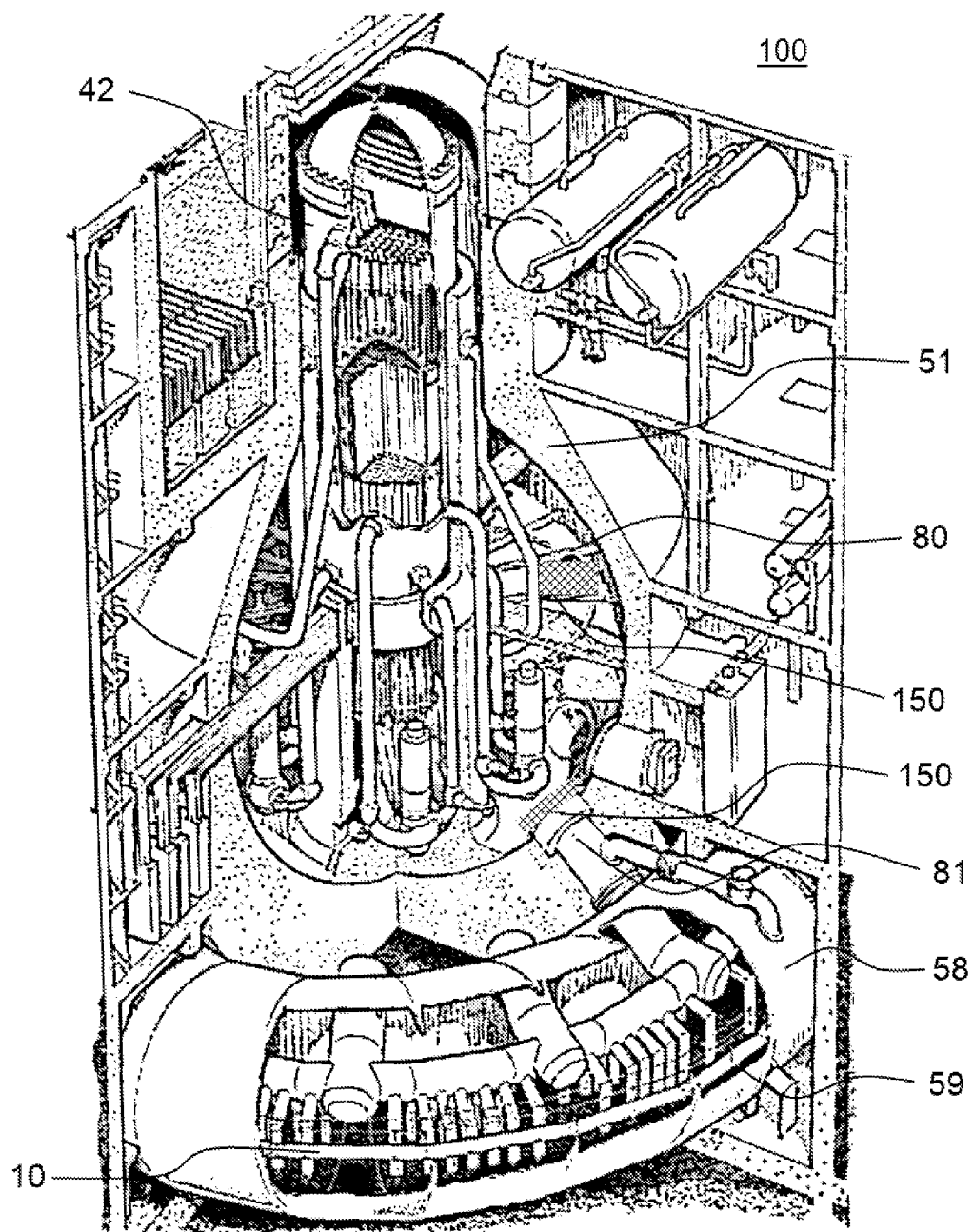
FIG. 2 is a schematic of a nuclear power containment using an example embodiment system

FIG. 2 is a schematic of a reactor containment showing installation of an example embodiment filtering system 100. Although FIGS. 1 and 2 show differing containment designs housing like-numbered components, it is understood that either design, as well as several other containment designs, are useable with example embodiment systems.

As shown in FIG. 2, one or more debris filters 150 are outfitted in drywell 51 surrounding reactor pressure vessel 42. Filters 150 are strategically placed outside of any coolant sources, in areas where coolant may flow from drywell 51 into a coolant source such as suppression pool 59. For example, filters 150 may be placed along flooring 80 inside of drywell 51 where fluid coolant would be likely to flow in drywell 51, including platforms, personnel walkways, stairways, and/or grating. Or, for example, filters 150 may be placed at an entryway into downcomer tube 81, which flows into suppression pool 59 housed in a torus or suppression chamber 58, where fluid coolant would be likely to flow before entering suppression pool 59.

Although example embodiment system 100 shows filters 150 in flooring 80 and at downcomer tubes 81, it is understood that other recognized flow paths for coolant filtering are useable in example embodiments. In another containment design or different transient scenario, likely coolant flows may be at other positions, and filtering may be provided at these other positions by placing filters 150 in such coolant flows. For example, filters 150 may be placed about main steam legs, reactor pressure vessel bottoms, and/or jet pumps if these areas are likely to experience fluid coolant flow that may flow into a coolant source for reactor emergency cooling. In this way, a user can determine any likely coolant flow path into an emergency coolant source for a given transient and containment configuration and install filters 150 in these areas of containment before such transient occurs.

Because example embodiment system 100 may use filters 150 installed outside coolant, for example, not underwater in suppression pool 59, filters 150 may not become clogged with sediment or other materials present in coolant sources. Filters 150 outside of coolant sources may further filter coolant much sooner and closer in proximity to where coolant flow originates within containment. As such, filters 150 may intercept and filter only coolant flow that exists in transient scenarios, keeping filters 150 relatively less clogged, and filters 150 may prevent debris, especially smaller debris, from being entrained in coolant flows in containment to flow into coolant sources. For example, filter 150 placed at a head of downcomer tubes 81 may filter coolant flowing from a coolant leak into drywell 51 before such coolant can flow into suppression pool 59. This may prevent or reduce any debris from flowing into suppression pool 59 and ultimately into any injection point, such as reactor 42, in a transient scenario.

Because example embodiment system 100 may use filters 150 installed within accessible areas of drywell 51, installation and maintenance of system 100 may be achieved during plant construction and regular maintenance or refueling outages. For example, personnel may be able to ready access filters 150 installed in open-air spaces that may become fluid flow paths during transients, such as in flooring 80 or downcomer tubes 81. Personnel may thus regularly inspect, clean, and or replace filters 150 without need to drain suppression pool 59 or perform underwater maintenance.

Figure 3:
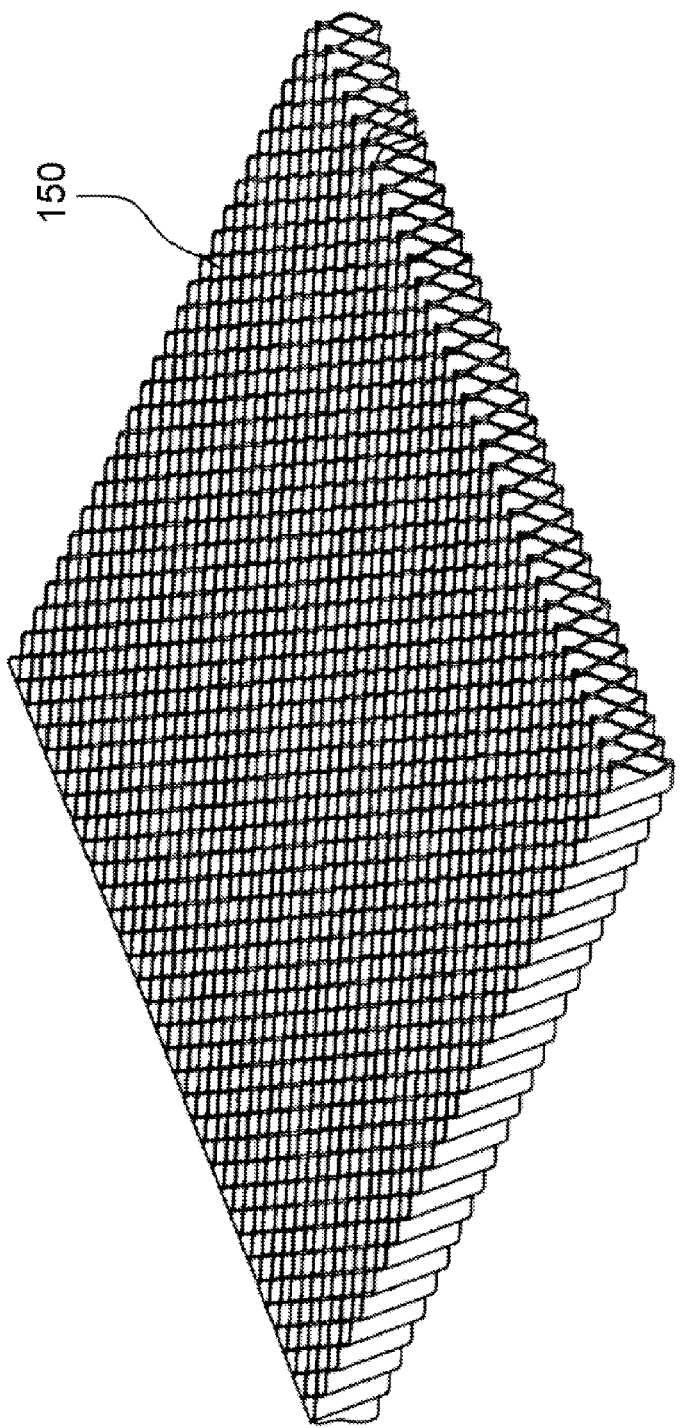
FIG. 3 is an illustration of an example embodiment filter.

Several different filter materials and configurations are useable as filters 150. Filters 150 may be chosen based on anticipated flow volume and debris type at their area of installation. For example, filters with rigid, open channels like those used in connection with fuel bundles may be installed as filters 150 in FIG. 2. An example of such a filter 150 is shown in FIG. 3. Filter 150 of FIG. 3 is described in co-owned U.S. Pat. No. 8,317,035 to Elkins et al., the contents of which is incorporated herein in its entirety. Filters from Elkins may be effective at trapping smaller debris typically found in recirculating reactor coolant that may escape outside of reactor 42 during a transient or that may be created in particularly energetic transients. Filters 150 otherwise permit fluid flow into coolant sources like suppression pool 59, such that coolant can be injected into reactor 42 via ECCS line 10 or otherwise used to mitigate temperature and pressure with less clogging or other damaging potential from entrained debris. Similarly, other strainers, screens, etc. can be used for filters 150 depending on anticipated coolant flow, including perforated metal plates, wire meshes, fiberglass filters, etc.

Example embodiments and methods thus being described, it will be appreciated by one skilled in the art that example embodiments may be varied and substituted through routine experimentation while still falling within the scope of the following claims. For example, a variety of different reactor and containment designs are compatible with example embodiments and methods simply through proper dimensioning and placement of example embodiments—and fall within the scope of the claims. Such variations are not to be regarded as departure from the scope of these claims.

What is claimed is:

1. A method for removing debris from nuclear power reactor coolant, the method comprising:
    identifying a flow path from the reactor to a coolant source where coolant will flow when escaping from a reactor system;
    flooding the coolant source;
    operating the reactor to produce electricity with the coolant source flooded; and
    after the flooding, installing a coolant filter in the flow path and outside the coolant source.

2. The method of claim 1, wherein the installing is performed during an operational outage of the nuclear power reactor.

3. The method of claim 1, wherein the coolant source is a suppression pool holding coolant that is injected into the reactor during a transient.

4. The method of claim 3, wherein the flow path passes through at least one of a floor grating in a containment building of the nuclear power reactor and a downcomer tube connecting a drywell of the nuclear power reactor to the suppression pool.

5. The method of claim 4, wherein the installing includes installing a first coolant filter substantially throughout an intersection of the drywell with the downcomer tube and a second filter under the floor grating.

6. The method of claim 1, wherein the filter includes a plurality of rigid and open channels through which coolant can flow.

7. The method of claim 6, wherein the filter is fabricated of only metal and does not substantially absorb any coolant.

8. The method of claim 1, wherein the installing installs the coolant filter within a containment building of the nuclear power reactor so as to come into contact with the coolant only in the instance of a leak when the coolant flows from the reactor into the source.

9. The method of claim 1, wherein the installing installs the coolant filter entirely vertically above the coolant source, and wherein the coolant source includes no filter.

10. The method of claim 1, wherein the coolant source is a suppression pool including a vent to receive steam to be condensed in the suppression pool, wherein the suppression pool is connected to an injection line connecting coolant from the suppression pool to the reactor, and wherein the installing installs the coolant filter entirely separate from the vent and the injection line.

11. The method of claim 1, wherein the installing is performed with the coolant source in a flooded state throughout the installing.

12. The method of claim 6, wherein the filter includes a plurality of waveform plates, and wherein the channels are created by paired peaks and troughs of directly adjacent plates.

13. The method of claim 6, wherein the channels extend at an angle from a central axis of the filter.

14. The method of claim 6, wherein the flow path is in a containment building and originates at a failure in the reactor system, and wherein the filter is installed in the flow path in an open air position in the containment.

15. The method of claim 1, wherein,
    the coolant source is a suppression pool including a vent to receive steam that is condensed in the suppression pool,
    the suppression pool is connected to an injection line connecting coolant from the suppression pool to the reactor,
    the suppression pool is in a flooded state throughout the installing, and
    the coolant filter includes a plurality of angled channels forms between adjacent waveform plates.

* * * * *